US012603063B2

(12) United States Patent
Crounse et al.

(10) Patent No.: US 12,603,063 B2
(45) Date of Patent: Apr. 14, 2026

(54) COLOR ELECTROPHORETIC DISPLAYS INCORPORATING METHODS FOR REDUCING IMAGE ARTIFACTS DURING PARTIAL UPDATES

(71) Applicant: E INK CORPORATION, Billerica, MA (US)

(72) Inventors: Kenneth R. Crounse, Somerville, MA (US); Yuval Ben-Dov, Cambridge, MA (US); Stephen J. Telfer, Arlington, MA (US); Jaya Kumar, Kuala Lumpur (MY)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 18/662,596

(22) Filed: May 13, 2024

(65) Prior Publication Data

US 2024/0296804 A1 Sep. 5, 2024

Related U.S. Application Data

(63) Continuation of application No. 18/083,743, filed on Dec. 19, 2022, now Pat. No. 12,020,658, which is a continuation of application No. 17/515,668, filed on Nov. 1, 2021, now Pat. No. 11,557,260.

(60) Provisional application No. 63/108,852, filed on Nov. 2, 2020.

(51) Int. Cl.
*G09G 3/34* (2006.01)
*G09G 5/06* (2006.01)

(52) U.S. Cl.
CPC ............... *G09G 3/344* (2013.01); *G09G 5/06* (2013.01); *G09G 2230/00* (2013.01)

(58) Field of Classification Search
None
See application file for complete search history.

(56) References Cited

U.S. PATENT DOCUMENTS

| | | | |
|---|---|---|---|
| 4,418,346 | A | 11/1983 | Batchelder |
| 5,760,761 | A | 6/1998 | Sheridon |
| 5,777,782 | A | 7/1998 | Sheridon |
| 5,808,783 | A | 9/1998 | Crowley |
| 5,872,552 | A | 2/1999 | Gordon, II et al. |
| 6,054,071 | A | 4/2000 | Mikkelsen, Jr. |
| 6,055,091 | A | 4/2000 | Sheridon et al. |
| 6,097,531 | A | 8/2000 | Sheridon |

(Continued)

FOREIGN PATENT DOCUMENTS

| | | | |
|---|---|---|---|
| CN | 111369950 | A | 7/2020 |
| JP | 2017120315 | A | 7/2017 |
| WO | 2007004120 | A2 | 1/2007 |

OTHER PUBLICATIONS

Wood, D., "An Electrochromic Renaissance?" Information Display, 18(3), 24 (Mar. 2002).

(Continued)

*Primary Examiner* — Matthew Yeung
(74) *Attorney, Agent, or Firm* — Brian D. Bean

(57) ABSTRACT

A color electrophoretic display that includes sets of duplicative waveforms to reduce visible artifacts during image updates. Such methods include driving extra pixels where the boundary between a driven and undriven area would otherwise lead to artifact by providing paired sets of driving instructions, allowing the undriven area to be driven while maintain the desired (undriven) optical state.

11 Claims, 3 Drawing Sheets

(56) References Cited

U.S. PATENT DOCUMENTS

| | | | |
|---|---|---|---|
| 6,128,124 | A | 10/2000 | Silverman |
| 6,130,774 | A | 10/2000 | Albert et al. |
| 6,137,467 | A | 10/2000 | Sheridon et al. |
| 6,144,361 | A | 11/2000 | Gordon, II et al. |
| 6,147,791 | A | 11/2000 | Sheridon |
| 6,172,798 | B1 | 1/2001 | Albert et al. |
| 6,184,856 | B1 | 2/2001 | Gordon, II et al. |
| 6,225,971 | B1 | 5/2001 | Gordon, II et al. |
| 6,241,921 | B1 | 6/2001 | Jacobson et al. |
| 6,271,823 | B1 | 8/2001 | Gordon, II et al. |
| 6,301,038 | B1 | 10/2001 | Fitzmaurice et al. |
| 6,672,921 | B1 | 1/2004 | Liang et al. |
| 6,788,449 | B2 | 9/2004 | Liang et al. |
| 6,866,760 | B2 | 3/2005 | Paolini, Jr. et al. |
| 6,870,657 | B1 | 3/2005 | Fitzmaurice et al. |
| 6,922,276 | B2 | 7/2005 | Zhang et al. |
| 6,950,220 | B2 | 9/2005 | Abramson et al. |
| 6,982,178 | B2 | 1/2006 | LeCain et al. |
| 7,002,728 | B2 | 2/2006 | Pullen et al. |
| 7,012,600 | B2 | 3/2006 | Zehner et al. |
| 7,075,502 | B1 | 7/2006 | Drzaic et al. |
| 7,116,318 | B2 | 10/2006 | Amundson et al. |
| 7,119,772 | B2 | 10/2006 | Amundson et al. |
| 7,170,670 | B2 | 1/2007 | Webber |
| 7,236,291 | B2 | 6/2007 | Kaga et al. |
| 7,312,784 | B2 | 12/2007 | Baucom et al. |
| 7,321,459 | B2 | 1/2008 | Masuda et al. |
| 7,339,715 | B2 | 3/2008 | Webber et al. |
| 7,411,719 | B2 | 8/2008 | Paolini, Jr. et al. |
| 7,420,549 | B2 | 9/2008 | Jacobson et al. |
| 7,453,445 | B2 | 11/2008 | Amundson |
| 7,535,624 | B2 | 5/2009 | Amundson et al. |
| 7,679,814 | B2 | 3/2010 | Paolini, Jr. et al. |
| 7,839,564 | B2 | 11/2010 | Whitesides et al. |
| 8,009,348 | B2 | 8/2011 | Zehner et al. |
| 8,319,759 | B2 | 11/2012 | Jacobson et al. |
| 8,558,855 | B2 | 10/2013 | Sprague et al. |
| 8,576,164 | B2 | 11/2013 | Sprague et al. |
| 8,717,280 | B2 | 5/2014 | de Zeeuw |
| 8,797,302 | B2 | 8/2014 | Shinn et al. |
| 8,842,139 | B2 | 9/2014 | Kanamori |
| 8,890,907 | B2 * | 11/2014 | Kanamori .............. G09G 3/344 345/208 |
| 8,902,152 | B2 | 12/2014 | Bai et al. |
| 9,299,294 | B2 | 3/2016 | Lin et al. |
| 9,495,918 | B2 | 11/2016 | Harrington et al. |
| 9,939,707 | B2 | 4/2018 | Loxley et al. |
| 9,966,018 | B2 | 5/2018 | Gates et al. |
| 10,353,266 | B2 | 7/2019 | Bouchard et al. |
| 10,672,350 | B2 | 6/2020 | Amundson et al. |
| 10,891,906 | B2 | 1/2021 | Lin |
| 11,151,951 | B2 | 10/2021 | Lin et al. |
| 2008/0303780 | A1 | 12/2008 | Sprague et al. |
| 2016/0133196 | A1 | 5/2016 | Emelie et al. |
| 2017/0287377 | A1 * | 10/2017 | Telfer ................... G09G 3/2003 |
| 2018/0102081 | A1 * | 4/2018 | Lu ........................ G09G 3/2014 |
| 2018/0259824 | A1 * | 9/2018 | Bouchard .............. G09G 3/207 |

OTHER PUBLICATIONS

O'Regan, B. et al., "A Low Cost, High-efficiency Solar Cell Based on Dye-sensitized colloidal TiO2 Films", Nature, vol. 353, pp. 737-740 (Oct. 24, 1991).

Bach, Udo. et al., "Nanomaterials-Based Electrochromics for Paper-Quality Displays", Adv. Mater, vol. 14, No. 11, pp. 845-848, (Jun. 5, 2002).

Hayes, R.A. et al., "Video-Speed Electronic Paper Based on Electrowetting", Nature, vol. 425, No. 25, pp. 383-385 (Sep. 2003).

Kitamura, T. et al., "Electrical toner movement for electronic paper-like display", Asia Display/IDW '01, pp. 1517-1520, Paper HCS1-1 (2001).

Yamaguchi, Y. et al., "Toner display using insulative particles charged triboelectrically", Asia Display/IDW '01, pp. 1729-1730, Paper AMD4-4 (2001).

Korean Intellectual Property Office, "International Search Report and Written Opinion", PCT/US2021/057503, Feb. 17, 2022.

European Patent Office, "Extended European Search Report", EP Appl. No. 21887699.3, May 14, 2024.

* cited by examiner

COLOR ELECTROPHORETIC DISPLAYS INCORPORATING METHODS FOR REDUCING IMAGE ARTIFACTS DURING PARTIAL UPDATES

REFERENCE TO RELATED APPLICATIONS

This application is a continuation of U.S. patent application Ser. No. 18/083,743, filed Dec. 19, 2022 and published as US Patent Publication No. 2023-0120212, which is a continuation of U.S. patent application Ser. No. 17/515,668, filed Nov. 1, 2021, now U.S. Pat. No. 11,557,260, which claims priority to U.S. Provisional Patent Application No. 63/108,852, filed Nov. 2, 2020. All patents and publications disclosed herein are incorporated by reference in their entireties.

BACKGROUND OF INVENTION

The present invention relates to methods for driving electro-optic displays, especially bistable electro-optic displays, and to apparatus for use in such methods. More specifically, this invention relates to driving methods which may allow for reduced "ghosting", "blooming" or other edge effects during partial updates of the display. This invention is especially, but not exclusively, intended for use with particle-based electrophoretic displays in which one or more types of electrically charged particles are present in a fluid and are moved through the fluid under the influence of an electric field to change the appearance of the display. The methods are broadly applicable to a bistable electro-optic medium where it is beneficial to leave a large portion of the image not updated, while causing a smaller portion of the image to change optical state.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The term "gray state" is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate "gray state" would actually be pale blue. Indeed, as already mentioned, the change in optical state may not be a color change at all. The terms "black" and "white" may be used hereinafter to refer to the two extreme optical states of a display, and should be understood as normally including extreme optical states which are not strictly black and white, for example the aforementioned white and dark blue states. The term "monochrome" may be used hereinafter to denote a drive scheme which only drives pixels to their two extreme optical states with no intervening gray states.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

The term "impulse" is used herein in its conventional meaning of the integral of voltage with respect to time. However, some bistable electro-optic media act as charge transducers, and with such media an alternative definition of impulse, namely the integral of current over time (which is equal to the total charge applied) may be used. The appropriate definition of impulse should be used, depending on whether the medium acts as a voltage-time impulse transducer or a charge impulse transducer.

Much of the discussion below will focus on methods for driving one or more pixels of an electro-optic display through a transition from an initial gray level to a final gray level (which may or may not be different from the initial gray level). The term "waveform" will be used to denote the entire voltage against time curve used to effect the transition from one specific initial gray level to a specific final gray level. Typically such a waveform will comprise a plurality of waveform elements; where these elements are essentially rectangular (i.e., where a given element comprises application of a constant voltage for a period of time); the elements may be called "pulses" or "drive pulses". The term "drive scheme" denotes a set of waveforms sufficient to effect all possible transitions between gray levels for a specific display. A display may make use of more than one drive scheme; for example, the aforementioned U.S. Pat. No. 7,012,600 teaches that a drive scheme may need to be modified depending upon parameters such as the temperature of the display or the time for which it has been in operation during its lifetime, and thus a display may be provided with a plurality of different drive schemes to be used at differing temperature etc. A set of drive schemes used in this manner may be referred to as "a set of related drive schemes." It is also possible, as described in several of the aforementioned MEDEOD applications, to use more than one drive scheme simultaneously in different areas of the same display, and a set of drive schemes used in this manner may be referred to as "a set of simultaneous drive schemes."

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14 (11), 845. Nanochromic films of this type are also described, for example, in U.S. Pat. Nos. 6,301,038; 6,870,657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting displays can be made bistable.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in the these patents and applications include:

(a) Electrophoretic particles, fluids and fluid additives; see for example U.S. Pat. Nos. 7,002,728; and 7,679,814;

(b) Capsules, binders and encapsulation processes; see for example U.S. Pat. Nos. 6,922,276; and 7,411,719;

(c) Films and sub-assemblies containing electro-optic materials; see for example U.S. Pat. Nos. 6,982,178; and 7,839,564;

(d) Backplanes, adhesive layers and other auxiliary layers and methods used in displays; see for example U.S. Pat. Nos. 7,116,318; and 7,535,624;

(e) Color formation and color adjustment; see for example U.S. Pat. No. 7,075,502; and U.S. Patent Application Publication No. 2007/0109219;

(f) Methods for driving displays; see the aforementioned MEDEOD applications;

(g) Applications of displays; see for example U.S. Pat. No. 7,312,784; and U.S. Patent Application Publication No. 2006/0279527; and (h) Non-electrophoretic displays, as described in U.S. Pat. Nos. 6,241,921; 6,950,220; and 7,420,549; and U.S. Patent Application Publication No. 2009/0046082.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode may be useful in multi-layer structures for full color displays; in such structures, at least one layer adjacent the viewing surface of the display operates in shutter mode to expose or conceal a second layer more distant from the viewing surface.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

Other types of electro-optic media may also be used in the displays of the present invention.

The bistable or multi-stable behavior of particle-based electrophoretic displays, and other electro-optic displays displaying similar behavior (such displays may hereinafter for convenience be referred to as "impulse driven displays"), is in marked contrast to that of conventional liquid crystal ("LC") displays. Twisted nematic liquid crystals are not bi- or multi-stable but act as voltage transducers, so that applying a given electric field to a pixel of such a display produces a specific gray level at the pixel, regardless of the gray level previously present at the pixel. Furthermore, LC displays are only driven in one direction (from non-transmissive or "dark" to transmissive or "light"), the reverse transition from a lighter state to a darker one being effected by reducing or eliminating the electric field. Finally, the gray level of a pixel of an LC display is not sensitive to the polarity of the electric field, only to its magnitude, and indeed for technical reasons commercial LC displays usually reverse the polarity of the driving field at frequent intervals. In contrast, bistable electro-optic displays act, to a first approximation, as impulse transducers, so that the final state of a pixel depends not only upon the electric field applied and the time for which this field is applied, but also upon the state of the pixel prior to the application of the electric field.

Whether or not the electro-optic medium used is bistable, to obtain a high-resolution display, individual pixels of a display must be addressable without interference from adjacent pixels. One way to achieve this objective is to provide an array of non-linear elements, such as transistors or diodes, with at least one non-linear element associated with each pixel, to produce an "active matrix" display. An addressing or pixel electrode, which addresses one pixel, is connected to an appropriate voltage source through the associated non-linear element. Typically, when the non-linear element is a transistor, the pixel electrode is connected to the drain of the transistor, and this arrangement will be assumed in the following description, although it is essentially arbitrary and the pixel electrode could be connected to the source of the transistor. Conventionally, in high resolution arrays, the pixels are arranged in a two-dimensional array of rows and columns, such that any specific pixel is uniquely defined by the intersection of one specified row and one specified column. The sources of all the transistors in each column are connected to a single column electrode, while the gates of all the transistors in each row are connected to a single row electrode; again the assignment of sources to rows and gates to columns is conventional but essentially arbitrary, and could be reversed if desired. The row electrodes are connected to a row driver, which essentially ensures that at any given moment only one row is selected, i.e., that there is applied to the selected row electrode a voltage such as to ensure that all the transistors in the selected row are conductive, while there is applied to all other rows a voltage such as to ensure that all the transistors in these non-selected rows remain non-conductive. The column electrodes are connected to column drivers, which place upon the various column electrodes voltages selected to drive the pixels in the selected row to their desired optical states. (The aforementioned voltages are relative to a common front electrode which is conventionally provided on the opposed side of the electro-optic medium from the non-linear array and extends across the whole display.) After a pre-selected interval known as the "line address time" the selected row is deselected, the next row is selected, and the voltages on the column drivers are changed so that the next line of the display is written. This process is repeated so that the entire display is written in a row-by-row manner.

It might at first appear that the ideal method for addressing such an impulse-driven electro-optic display would be so-called "general grayscale image flow" in which a controller arranges each writing of an image so that each pixel transitions directly from its initial gray level to its final gray level. However, inevitably there is some error in writing images on an impulse-driven display. Some such errors encountered in practice include:

(a) Prior State Dependence; With at least some electro-optic media, the impulse required to switch a pixel to a new optical state depends not only on the current and desired optical state, but also on the previous optical states of the pixel.

(b) Dwell Time Dependence; With at least some electro-optic media, the impulse required to switch a pixel to a new optical state depends on the time that the pixel has spent in its various optical states. The precise nature of this dependence is not well understood, but in general, more impulse is required the longer the pixel has been in its current optical state.

(c) Temperature Dependence; The impulse required to switch a pixel to a new optical state depends heavily on temperature.

(d) Humidity Dependence; The impulse required to switch a pixel to a new optical state depends, with at least some types of electro-optic media, on the ambient humidity.

(e) Mechanical Uniformity; The impulse required to switch a pixel to a new optical state may be affected by mechanical variations in the display, for example variations in the thickness of an electro-optic medium or an associated lamination adhesive. Other types of mechanical non-uniformity may arise from inevitable variations between different manufacturing batches of medium, manufacturing tolerances and materials variations.

(f) Voltage Errors; The actual impulse applied to a pixel will inevitably differ slightly from that theoretically applied because of unavoidable slight errors in the voltages delivered by drivers.

General grayscale image flow suffers from an "accumulation of errors" phenomenon. For example, imagine that temperature dependence results in a 0.2 L* (where L* has the usual CIE definition:

$$L^*=116(R/R_0)^{1/3}-16,$$

where R is the reflectance and $R_0$ is a standard reflectance value) error in the positive direction on each transition. After fifty transitions, this error will accumulate to 10 L*. Perhaps more realistically, suppose that the average error on each transition, expressed in terms of the difference between the theoretical and the actual reflectance of the display is ±0.2 L*. After 100 successive transitions, the pixels will display an average deviation from their expected state of 2 L*; such deviations are apparent to the average observer on certain types of images.

This accumulation of errors phenomenon applies not only to errors due to temperature, but also to errors of all the types listed above. As described in the aforementioned U.S. Pat. No. 7,012,600, compensating for such errors is possible, but only to a limited degree of precision. For example, temperature errors can be compensated by using a temperature sensor and a lookup table, but the temperature sensor has a limited resolution and may read a temperature slightly different from that of the electro-optic medium. Similarly, prior state dependence can be compensated by storing the prior states and using a multi-dimensional transition matrix, but controller memory limits the number of states that can be recorded and the size of the transition matrix that can be stored, placing a limit on the precision of this type of compensation.

Thus, general grayscale image flow requires very precise control of applied impulse to give good results, and empirically it has been found that, in the present state of the technology of electro-optic displays, general grayscale image flow is infeasible in a commercial display.

Under some circumstances, it may be desirable for a single display to make use of multiple drive schemes. For example, a display capable of more than two gray levels may make use of a gray scale drive scheme ("GSDS") which can effect transitions between all possible gray levels, and a monochrome drive scheme ("MDS") which effects transitions only between two gray levels, the MDS providing quicker rewriting of the display that the GSDS. The MDS is used when all the pixels which are being changed during a rewriting of the display are effecting transitions only between the two gray levels used by the MDS. For example, the aforementioned U.S. Pat. No. 7,119,772 describes a display in the form of an electronic book or similar device capable of displaying gray scale images and also capable of displaying a monochrome dialogue box which permits a user to enter text relating to the displayed images. When the user is entering text, a rapid MDS is used for quick updating of the dialogue box, thus providing the user with rapid confirmation of the text being entered. On the other hand, when the entire gray scale image shown on the display is being changed, a slower GSDS is used.

Alternatively, a display may make use of a GSDS simultaneously with a "direct update" drive scheme ("DUDS"). The DUDS may have two or more than two gray levels, typically fewer than the GSDS, but the most important characteristic of a DUDS is that transitions are handled by a simple unidirectional drive from the initial gray level to the final gray level, as opposed to the "indirect" transitions often used in a GSDS, where in at least some transitions the pixel is driven from an initial gray level to one extreme optical state, then in the reverse direction to a final gray level; in some cases, the transition may be effected by driving from the initial gray level to one extreme optical state, thence to the opposed extreme optical state, and only then to the final extreme optical state—see, for example, the drive scheme illustrated in FIGS. 11A and 11B of the aforementioned U.S. Pat. No. 7,012,600. Thus, present electrophoretic displays may have an update time in grayscale mode of about two to three times the length of a saturation pulse (where "the length of a saturation pulse" is defined as the time period, at a specific voltage, that suffices to drive a pixel of a display from one extreme optical state to the other), or approximately 700-900 milliseconds, whereas a DUDS has a maximum update time equal to the length of the saturation pulse, or about 200-300 milliseconds.

Variation in drive schemes is, however, not confined to differences in the number of gray levels used. For example, drive schemes may be divided into global drive schemes, where a drive voltage is applied to every pixel in the region to which the global update drive scheme (more accurately referred to as a "global complete" or "GC" drive scheme) is being applied (which may be the whole display or some defined portion thereof) and partial update drive schemes, where a drive voltage is applied only to pixels that are undergoing a non-zero transition (i.e., a transition in which the initial and final gray levels differ from each other), but no drive voltage is applied during zero transitions (in which the initial and final gray levels are the same). An intermediate form a drive scheme (designated a "global limited" or "GL" drive scheme) is similar to a GC drive scheme except that no drive voltage is applied to a pixel which is undergoing a zero, white-to-white transition. In, for example, a display used as an electronic book reader, displaying black text on a white background, there are numerous white pixels, especially in the margins and between lines of text which remain unchanged from one page of text to the next; hence, not rewriting these white pixels substantially reduces the apparent "flashiness" of the display rewriting. However, certain problems remain in this type of GL drive scheme. Firstly, as discussed in detail in some of the aforementioned MEDEOD applications, bistable electro-optic media are typically not completely bistable, and pixels placed in one extreme optical state gradually drift, over a period of minutes to hours, towards an intermediate gray level. In particular, pixels driven white slowly drift towards a light gray color. Hence, if in a GL drive scheme a white pixel is allowed to remain undriven through a number of page turns, during which other white pixels (for example, those forming parts of the text characters) are driven, the freshly updated white pixels will be slightly lighter than the undriven white pixels, and eventually the difference will become apparent even to an untrained user.

Secondly, when an undriven pixel lies adjacent a pixel which is being updated, a phenomenon known as "blooming" occurs, in which the driving of the driven pixel causes a change in optical state over an area slightly larger than that of the driven pixel, and this area intrudes into the area of adjacent pixels. Such blooming manifests itself as edge effects along the edges where the undriven pixels lie adjacent driven pixels. Similar edge effects occur when using regional updates (where only a particular region of the display is updated, for example to show an image), except that with regional updates the edge effects occur at the boundary of the region being updated. Over time, such edge effects become visually distracting and must be cleared. Hitherto, such edge effects (and the effects of color drift in undriven white pixels) have typically been removed by using a single GC update at intervals. Unfortunately, use of such an occasional GC update reintroduces the problem of a "flashy" update, and indeed the flashiness of the update may be heightened by the fact that the flashy update only occurs at long intervals.

The present invention relates to reducing or eliminating the problems discussed above while still avoiding so far as possible flashy updates. However, there is an additional complication in attempting to solve the aforementioned problems, namely the need for overall DC balance. As discussed in many of the aforementioned MEDEOD applications, the electro-optic properties and the working lifetime of displays may be adversely affected if the drive schemes used are not substantially DC balanced (i.e., if the algebraic sum of the impulses applied to a pixel during any series of transitions beginning and ending at the same gray level is not close to zero). See especially the aforementioned U.S. Pat. No. 7,453,445, which discusses the problems of DC balancing in so-called “heterogeneous loops” involving transitions carried out using more than one drive scheme. A DC balanced drive scheme ensures that the total net impulse bias at any given time is bounded (for a finite number of gray states). In a DC balanced drive scheme, each optical state of the display is assigned an impulse potential (IP) and the individual transitions between optical states are defined such that the net impulse of the transition is equal to the difference in impulse potential between the initial and final states of the transition. In a DC balanced drive scheme, any round trip net impulse is required to be substantially zero.

SUMMARY OF INVENTION

Accordingly, in one aspect, this invention provides a method to reduce or eliminate edge artifacts. Specifically, this method seeks to eliminate such artifacts which occur along a straight edge between what would be, in the absence of a special adjustment, driven and undriven pixels, also known as a partial update. In this method, at least two sets of control instructions are programmed for each optical state. During a partial update, some number of pixels, neighboring the updating pixel, but needing to maintain their current optical state, are updated at the same time as the updated pixel with the alternate paired instruction set. As a result, the pixels that don’t need to be updated, but are at risk for artifacts, are able to maintain their optical state and avoid artifacts. Furthermore, by alternating between paired instruction sets, it is not necessary to track the prior state of a given pixel. If it is near an updating pixel, after two updates most of the artifacts will have cleared. Driving neighboring pixels in this manner greatly reduces the visibility of edge artifacts, such as blooming, since any edge artifacts occurring along the edge defined by the extra pixels are much less conspicuous than would be without these methods.

In all the methods of the present invention, the display may make use of any of the type of electro-optic media discussed above. Thus, for example, the electro-optic display may comprise a rotating bichromal member or electrochromic material. Alternatively, the electro-optic display may comprise an electrophoretic material comprising a plurality of electrically charged particles disposed in a fluid and capable of moving through the fluid under the influence of an electric field. The electrically charged particles and the fluid may be confined within a plurality of capsules or microcells. Alternatively, the electrically charged particles and the fluid may be present as a plurality of discrete droplets surrounded by a continuous phase comprising a polymeric material. The fluid may be liquid or gaseous.

In another aspect, a method of driving a bistable electro-optic display including a controller. The bistable electro-optic display has a matrix of pixels arranged in rows and columns. The matrix includes a primary pixel that undergoes a transition from a first optical state to a second optical state, a secondary pixel immediately adjacent the primary pixel, wherein the secondary pixel undergoes a transition from a third optical state to a fourth optical state, and a tertiary pixel immediately adjacent the secondary pixel, the secondary pixel being between the primary pixel and the tertiary pixel in a row or in a column, wherein the tertiary pixel does not undergo an optical state transition. The resulting driving method comprises a) providing from the controller to the bistable electro-optic display a first update including a first waveform to the primary pixel, a third waveform to the secondary pixel, and a fifth waveform to the tertiary pixel, and b) providing from the controller to the bistable electro-optic display a second update including a second waveform to the primary pixel, a fourth waveform to the secondary pixel, and no waveform to the tertiary pixel, wherein the first and second optical states are different in color or gray scale while the third and fourth optical states are identical in color and gray scale.

In some embodiments, the third waveform, the fourth waveform, and the fifth waveform all produce identical optical states. In some embodiments, the method further comprises c) providing from the controller to the bistable electro-optic display a third update including a sixth waveform to the primary pixel, the third waveform to the secondary pixel, and no waveform to the tertiary pixel. In some embodiments, the bistable electro-optic display is an electrophoretic display. In some embodiments, the electrophoretic display includes an electrophoretic medium comprising at least three different types of electrophoretic particles. In some embodiments, the electrophoretic display comprises an electrophoretic medium disposed in a microcapsule layer. In some embodiments, the electrophoretic display comprises an electrophoretic medium disposed in microcells. In some embodiments, the bistable electro-optic display comprises a color filter array. In some embodiments, the bistable electro-optic display comprises at least 10 primary pixels, at least 10 secondary pixels, and at least 10 tertiary pixels. In some embodiments, the primary pixels define an edge of an image displayed on the bistable electro-optic display. In some embodiments, the bistable electro-optic display comprises at least 1000 pixels. In some embodiments, 20% or fewer of the pixels are primary pixels (number of primary pixels/total number of pixels). In some embodiments, the bistable electro-optic display is capable of producing at least 16 different colors or gray levels. In some embodiments, the bistable electro-optic display is capable of producing at least 32 different colors.

DETAILED DESCRIPTION

The method of the present invention seeks to reduce or eliminate edge artifacts which occur along a straight edge between driven and undriven pixels. The human eye is especially sensitive to linear edge artifacts, especially ones which extend along the rows or columns of a display. In this method, a number of pixels lying adjacent an edge between the driven and undriven areas are in fact driven, such that any edge effects caused by the transition are hidden or otherwise minimized.

Figure 1:
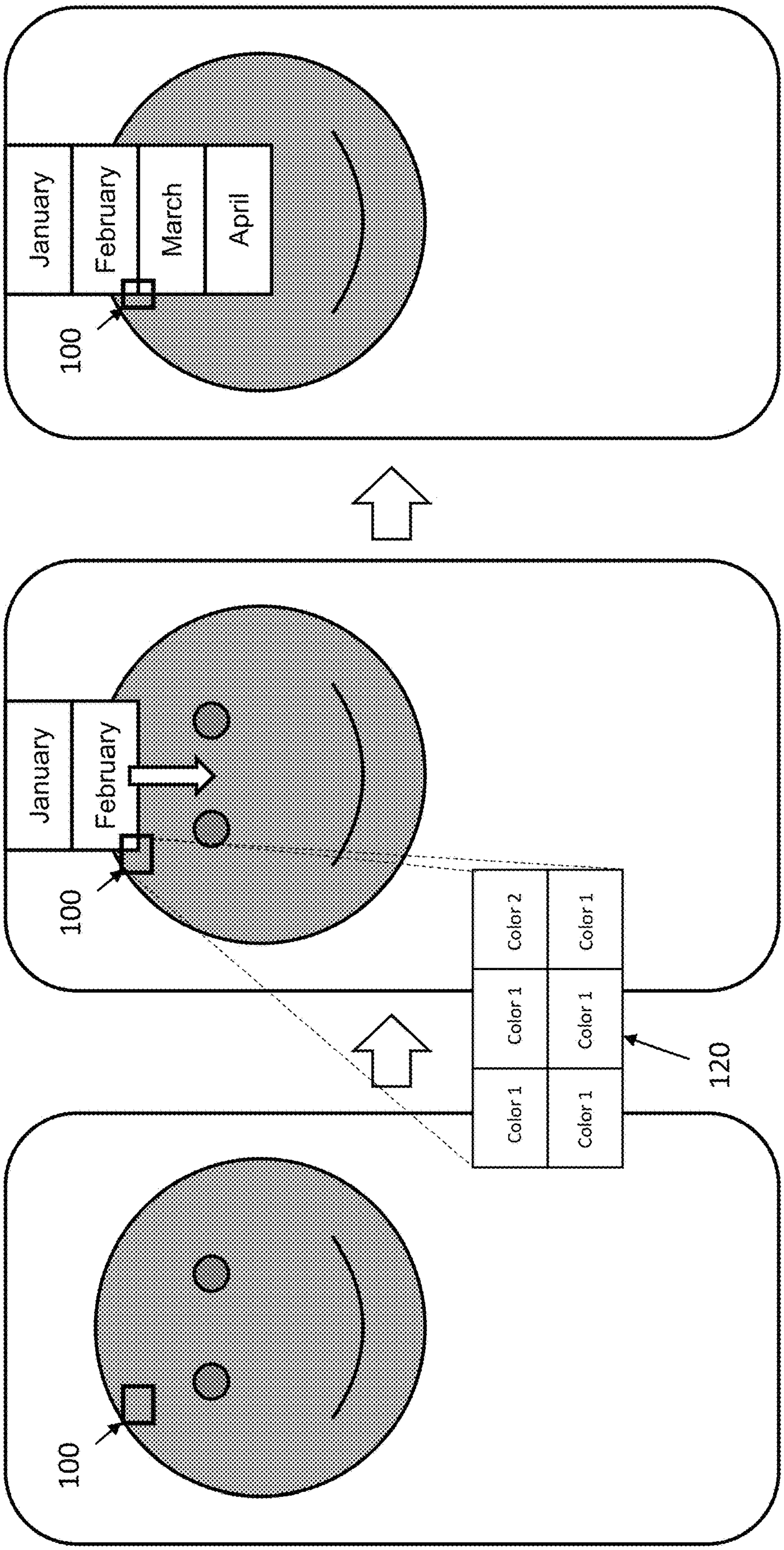
FIG. 1 illustrates how a set of pixels in a small region of a display may be differentially affected during a partial update, in this case a pull-down menu over a fixed image.

As discussed above, partial updates are typically used when only a portion of the image requires updating, such as pull-down menus, scrolling text, or simplified animation. An example is shown in FIG. 1, wherein a pull-down menu is advanced over an existing image. A subset of pixels 100 in a small area of the display will undergo disparate color transitions as the pull-down menu is advanced. For example, some pixels will change from dark to light and some pixels will not change their optical state. Some of the pixels will be near neighbors to pixels that are being updated, while some pixels will be sufficiently far away that they are unlikely to be effected by update artifacts such as blooming or ghosting. For the purposes of explanation, the subset of pixels 100 has been magnified 120, allowing a greater understanding of the phenomena with respect to FIGS. 2A and 2B.

One issue with partial updates is that pixels that border updated pixels may actually change color due to the driving of nearby neighbors, e.g., due to the presence of a nearby electric field, i.e., blooming. Moreover, while blooming during partial updates causes fuzzy edges in a black and white device, similar amounts of blooming in a color display, for example in an Advanced Color Electrophoretic Paper (ACeP®) medium, will result in actual color shifts in nearby pixels. Such color shifts are unwelcome by most users. Such color shifts are especially pronounced when dithering is used in the next image and some of the pixels in the dither pattern are the same color as those in the current display pixels. The effect can be so strong as to result in significant color loss.

Figure 2A:
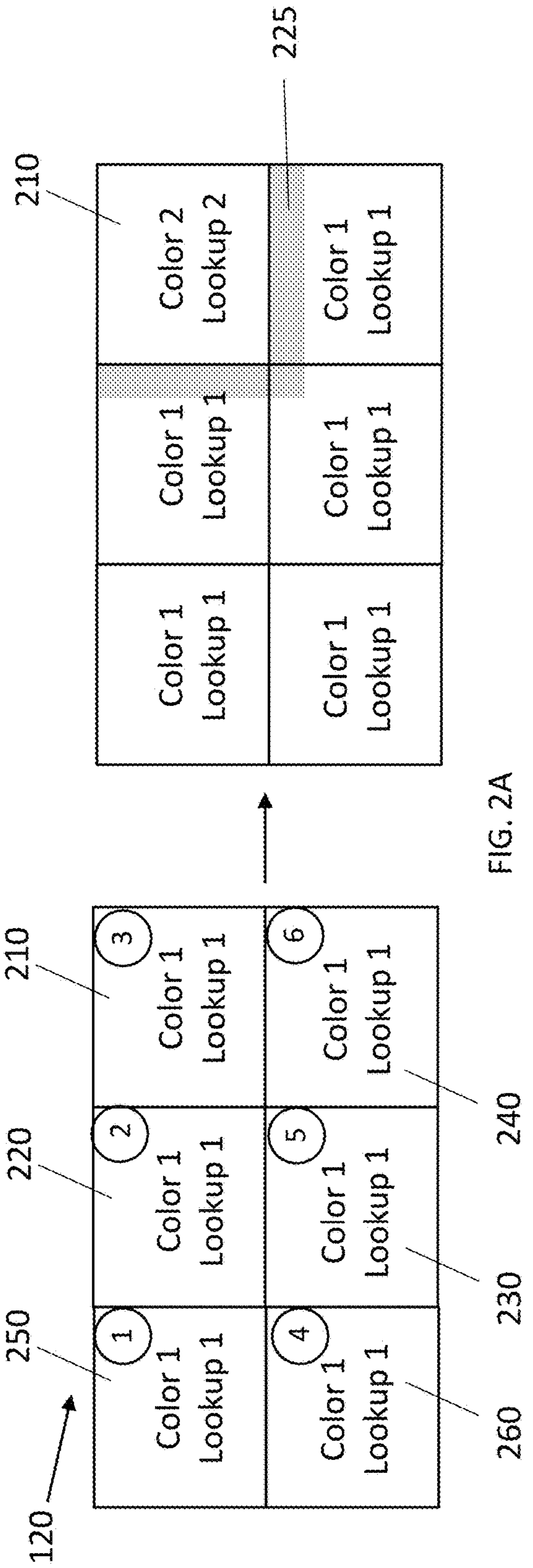
FIG. 2A illustrates a first method for updating a set of pixels in a small region of a display undergoing a partial update.
Figure 2B:
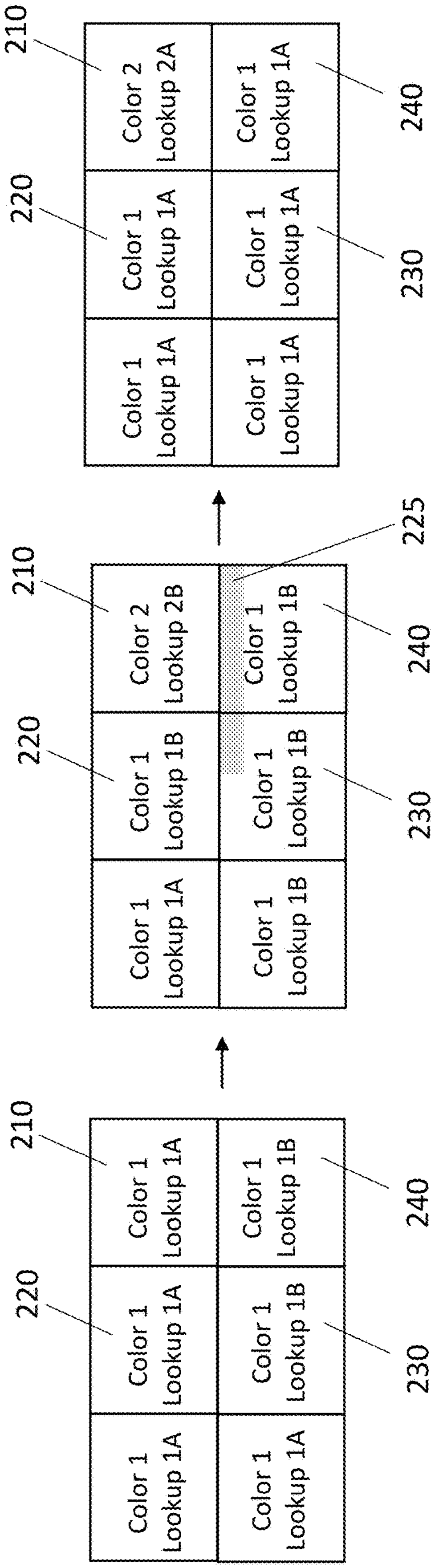
FIG. 2B illustrates a second method for updating a set of pixels in a small region of a display undergoing a partial update.

In a true partial update of the display, the controller will not update a pixel (i.e., provide a new set of voltages according to the look-up voltage list) if that pixel in image $I_2$ has not changed from image $I_1$. However, to avoid the artifacts discussed above, it is preferable to update certain pixels nearby the updated pixels with a new waveform that achieves the same color state. Compare FIGS. 2A and 2B. As shown in FIG. 2A, even though only the upper right-hand pixel 210 is being updated, the stray electric field lines from the update of pixel 210 can cause blooming 225 in the surrounding pixels because even though the surrounding pixels are held at a constant voltage, the electro-optic medium associated with those pixels is "seeing" the voltage from updated pixel 210. By implementing the techniques described below, the blooming can be essentially erased in one or two following updates, as shown in FIG. 2B.

In the instance of an ACeP-type electrophoretic display (i.e., four-particle electrophoretic medium including white, cyan, yellow, and magenta particles), a typical waveform has a 5-bit lookup: i.e., there are 32 different possible colors. However, it is often sufficient to use merely 16 different colors, which allows for duplication of the 16 different color waveforms. In such a system, e.g., waveforms 1 and 2 are both assigned to the color black, waveforms 3 and 4 both result in blue, etc. until we reach waveforms 31 and 32, which are both white. Each waveform in each of these pairs has the same voltage list.

The duplication of identical waveforms as different "colors" allows, e.g., a white pixel (waveform 32) bordering an updated pixel in a first image to then be assigned waveform 31 in the second image. When implemented as described herein, a controller would update all the pixels involved with an image as well as some near neighbors that would otherwise not be updated in a partial update. Nonetheless, because the near neighbor pixels are transitioning between the same color waveform those pixels would not change optical state. But because they are, in fact being updated, those pixels would not have any blooming due to nearby switching pixels erased. This same logic could be applied to reduce artifacts in a black and white display, for example, by using a 4-bit lookup, and creating 8 unique gray levels by way of 8 sets of paired waveforms for each gray level.

The technique can be implemented by starting with the area of the image and stamping in over it the element to be added, for example a menu or swipe band. During this composition, it is possible to examine the area where the new element is being added, and identify pixels where the self-transition is occurring. To force the controller to update those pixels, the solution is to change the state of the pixel in the next state image to be the mirror state, i.e. the other state with the same meaning. Note the current state of the pixel could be either parity (even or odd) because we don't know if this substitution has occurred before, however by alternating between paired waveforms during the various required updates, the un-updated pixels maintain the correct optical state.

It should be noted that the state labeling scheme with odd and even states described above is just an example and the same thing could be accomplished with many different definitions for the equivalent states. For example if the standard states were defined as 1-16 then the equivalent states could be defined as respectively as the states 17-32 in any random order. Clearly a scheme should be chosen which is simplest to implement in a given controller design. The method is not restricted to 16 states, but the only requirement is the controller can manage twice the number of nominal states.

The described methods could also be used in a "fade" update, where a series of intermediate images is provided between a first image $I_1$ and second image $I_2$, or generally $I_1$->2[1] through $I_1$->2[n]. In each of these intermediate images only a selected portion of the image area is changed from image $I_1$ to image $I_2$. For example, in $I_1$->2(1) perhaps 10% of the pixels are what they would be in $I_2$, while 90% remain what they are in $I_1$. The controller will only update the 10% $I_2$ pixels when asked to make a partial update. In $I_1$->2(2) the next 10% are updated, and so on. By the time we reach $I_1$->2(10), for example, the image update is complete.

Like the above example of a new edge on a pull-down menu, many pixels that are updated will be bordered by other pixels that do change between $I_1$ and $I_2$. As above, the un-updated (e.g., white) pixels will experience the fringe fields from the neighboring updates and will change color from the desired (e.g., white) state. To prevent this from occurring, there must be no states in image $I_1$ that are the same as in image $I_2$, even if they have the same color. This can be achieved by assigning two lookups for the same color in the waveform, and providing the alternative lookup during the course of the fade. In some instances, an "undriven" pixel, will thus be updated 2-3 times in the course of a transition, in order to maintain a consistent color in the un-updated area.

Returning to the figures of the application, the influence of the method of the invention can be visualized. As shown in FIG. 1, some subset of pixels 100 in FIG. 1 will updated. For the purposes of explanation, six pixels in two rows and three columns will be discussed, however the invention is broadly applicable to any number of pixels where the targeted updates (e.g., primary pixels) create an edge of an image being updated, typically over a field of another color or gray level. For the purpose of explanation, the pixels are numbered 1-6, with circles surrounding the pixel numbers in FIG. 2A. The pixel numbers are not carried through for simplicity.

In a conventional method, the update of pixel 210 (alone) from Color 1 to Color 2 would simply be a matter of the controller implementing Lookup 2, as shown in FIG. 2A. Because pixel 210, i.e., pixel number 3, is intentionally being updated with the state change, pixel 210 is a primary pixel. Because the neighboring (secondary) pixels (pixel 2, 5, 6) are not updated, all of the neighboring (secondary) pixels undergo some amount of blooming 225, which may be detrimental to the user experience. In other words, all of the neighboring pixels, 220, 230, 240 are at risk of blooming if not updated, similar to FIG. 2A. (Importantly, for the purpose of explanation, pixels 250 and 260, i.e., pixels 1 and 4 in FIG. 2A. are not neighboring pixels, but rather tertiary pixels, and typically are not ask risk for blooming when pixel 210 is updated). Looking at FIG. 2B, however, because pixel 220 is updated at the same time as pixel 210, pixel 220 maintains the same optical state as before, but without blooming 225.

In a different embodiment, and for the sake of comparison, the update may toggle every secondary pixel to a first or a second identical waveform with each update. For example, as shown in FIG. 2B, pixels 230 and 240 may have already been in the state achieved by the set of Lookup 1B, even though another secondary pixel (22) was in state Lookup 1A. Because pixels 230 and 240 would not have been updated when all "A" states are switched to "B" states, the update of the primary pixel (210) may give rise to blooming pixels 230, 240, as shown in the middle pixel set of FIG. 2B. However, after one additional update, this time from "B" to "A", the blooming 225 has been cleared, so that updating pixels 210, 220, 230, and 240 results in some (but not as much blooming) 225, as shown in FIG. 2B. This method provides the benefit that the actual state of each pixel does not need to be tracked by the controller. Rather, after two updates, all secondary pixels should have been updated at least once, allowing for the clearing of any unwanted blooming. In other words, for each subsequent update, the primary pixel optical states can be advanced without a need to compare those update states to the update states of the secondary pixels. In the end, all of the primary and second pixels, i.e., 210, 220, 230, and 240 are updated from Lookup XB to Lookup XA, thereby removing the blooming and keeping the image true.

Figure 3:
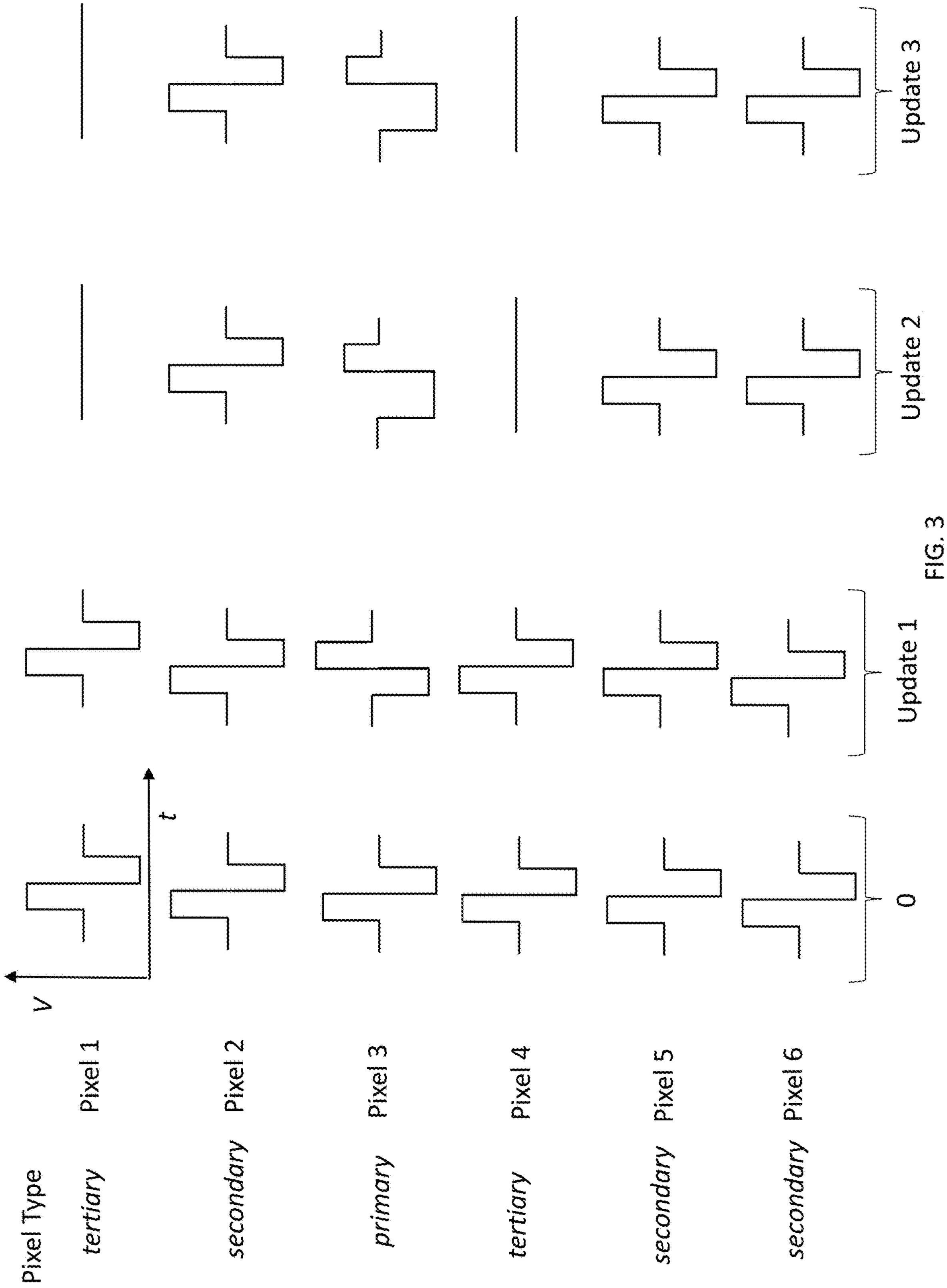
FIG. 3 illustrates exemplary waveform updates for six adjacent pixels undergoing three updates, wherein different pixels receive different waveforms according to the invention.

A further illustration of the invention, exemplary waveforms that are provided by the controller to each of pixels 1-6 are shown in FIG. 3. It is to be appreciated that the waveforms of FIG. 3 are generalizations and do not correspond to achieving a specific color or gray level. Furthermore, waveforms sent by the controller to the various pixels are typically more intricate and may include things such as, for example, preparatory state-erasing pulse, DC-balance pulses, post drive clean-up pulses, etc. Additionally the waveforms shown in FIG. 3 are generalized representations of voltage as a function of time and would typically include both positive and negative voltages.

The pixels in discussion begin from a common starting point, indicated as "0". With a first update, the controller delivers a first waveform to the primary electrode, which causes the primary pixel to change optical states. Meanwhile, the secondary as well as the tertiary pixels are updated with third and fifth waveforms, respectively. In the second update, the primary pixel is updated by the controller with a second different waveform, while the second pixels are updated with a fourth waveform that is the same waveform as the third waveform. The tertiary pixels, however, do not receive any update, as would typically happen with a direct update refresh, in which only the pixels that are directed to change optical states are updated. As a result, the primary pixel transitions from a first to a second optical state, that is the optical state of the primary pixel after the first update is different from the optical state of the primary pixel after the first update. However, the optical states of the secondary and tertiary pixels are the same with the second update. However, because the secondary pixels actually received a waveform from the controller, the pixels adjacent the primary pixels are "flashed" so that they maintain the correct optical state without ghosting. In some embodiments, a further third update may be provided, whereby the primary pixel and/or the secondary pixels receive yet another waveform. Typically, for both the primary and secondary pixels, the third update will be a waveform of one of the previous update states, typically the immediate previous update state. This assures that all blooming is removed from secondary pixels.

As will readily be apparent from the foregoing description, many of the methods of the present invention require or render desirable modifications in prior art display controllers. The inventions require a small amount of additional power as compared to lower power direct updates, but the overall viewer experience is improved. Certainly, the power consumption for the display implementing the invention is far less than if all pixels were updated with every update, as is done in full update mode. Various modifications of the display controller can be used to allow for the storage of transition information. For example, the image data table which normally stores the gray levels of each pixel in the final image may be modified to store one or more additional bits designating the class to which each pixel belongs. For example, an image data table which previously stored four bits for each pixel to indicate which of 16 gray levels the pixel assumes in the final image might be modified to store five bits for each pixel, with the most significant bit for each pixel defining which of two states (black or white) the pixel assumes in a monochrome intermediate image. Obviously, more than one additional bit may need to be stored for each pixel if the intermediate image is not monochrome, or if more than one intermediate image is used.

Alternatively, the different image transitions can be encoded into different waveform modes based upon a transition state map. For example, waveform Mode A would take a pixel through a transition that had a white state in the intermediate image, while waveform Mode B would take a pixel through a transition that had a black state in the intermediate image. Since each individual transition in waveform Mode A and waveform Mode B is the same, but simply delayed by the length of their respective first pulse, the same outcome may be achieved using a single waveform. Here the second update (global update in previous paragraph) is delayed by the length of the first waveform pulse. Then Image 2 is loaded into the image buffer and commanded with a global update using the same waveform. The same freedom with rectangular regions is necessary.

Another option is to use a controller architecture having separate final and initial image buffers (which are loaded alternately with successive images) with an additional memory space for optional state information. These feed a pipelined operator that can perform a variety of operations on every pixel while considering each pixel's nearest neighbors' initial, final and additional states, and the impact on the pixel under consideration. The operator calculates the waveform table index for each pixel and stores this in a separate memory location, and optionally alters the saved state information for the pixel. Alternatively, a memory format may be used whereby all of the memory buffers are joined into a single large word for each pixel. This provides a reduction in the number of reads from different memory locations for every pixel. Additionally a 32-bit word is proposed with a frame count timestamp field to allow arbitrary entrance into the waveform lookup table for any pixel (per-pixel-pipelining). Finally a pipelined structure for the operator is proposed in which three image rows are loaded into fast access registers to allow efficient shifting of data to the operator structure.

The frame count timestamp and mode fields can be used to create a unique designator into a mode's lookup table to provide the illusion of a per-pixel pipeline. These two fields allow each pixel to be assigned to one of 15 waveform modes (allowing one mode state to indicate no action on the selected pixel) and one of 8196 frames (currently well beyond the number of frames needed to update the display). The price of this added flexibility achieved by expanding the waveform index from 16-bits, as in prior art controller designs, to 32-bits, is display scan speed. In a 32-bit system twice as many bits for every pixel must be read from memory, and controllers have a limited memory bandwidth (rate at which data can be read from memory). This limits the rate at which a panel can be scanned, since the entire waveform table index (now comprised of 32-bit words for each pixel) must be read for each and every scan frame.

A memory and controller architecture which meets this requirement reserves a (region) bit in image buffer memory to designate any pixel for inclusion in a region. The region bit is used as a "gatekeeper" for modification of the update buffer and assignment of a lookup table number. The region bit may in fact comprise multiple bits which can be used to indicate separate, concurrently updateable, arbitrarily shaped regions that can be assigned different waveform modes, thus allowing arbitrary regions to be selected without creation of a new waveform mode.

Of course, the above description of the use of alternate paired instruction sets for removing blooming along the edges of an image in a device incorporating partial updates can be expanded to account for other factors that may influence blooming performance, such as prior state information (gray scale, color, dither), device temperature, device age, front light illumination intensity or spectrum. It is known that some electro-optic media display a memory effect and with such media it is desirable, when generating the output signal, to take into account not only the initial state of each pixel but also (at least) the first prior state of the same pixel, in which case alternative state instructions become a look-up table will be multi-dimensional. In some cases, it may be desirable to take into account more than one prior state of each pixel, thus resulting in a look-up table having three, four, five, six, or seven dimensions or more.

From a formal mathematical point of view, implementation of such methods may be regarded as comprising an algorithm that, given information about the initial, final and (optionally) prior states of an electro-optic pixel, as well as information about the physical state of the display (e. g., temperature and total operating time), will produce a function V(t) which can be applied to the pixel to effect a transition to the desired final state. From this formal point of view, the controller of the present invention may be regarded as essentially a physical embodiment of this algorithm, the controller serving as an interface between a device wishing to display information and an electro-optic display.

Ignoring the physical state information for the moment, the algorithm is, in accordance with the present invention, encoded in the form of a look-up table or transition matrix. This matrix will have one dimension each for the desired final state, and for each of the other states (initial and any prior states) are used in the calculation. The elements of the matrix will contain a function V(t) that is to be applied to the electro-optic medium. In the alternate paired instruction set method, each V(t) may have an alternate V(t) that accounts for, e.g., prior states or temperature, but allows the controller to effectively update neighboring pixels to maintain the correct optical state which avoiding unwanted blooming.

The elements of the look-up table or transition matrix may have a variety of forms. In some cases, each element may comprise a single number. For example, an electro-optic display may use a high precision voltage modulated driver circuit capable of outputting numerous different voltages both above and below a reference voltage, and simply apply the required voltage to a pixel for a standard, predetermined period. In such a case, each entry in the look-up table could simply have the form of a signed integer specifying which voltage is to be applied to a given pixel. In other cases, each element may comprise a series of numbers relating to different portions of a waveform. For example, there are described below embodiments of the invention which use single- or double-prepulse waveforms, and specifying such a waveform necessarily requires several numbers relating to different portions of the waveform. Alternatively, pulse length modulation may be implemented by using a predetermined voltage to a pixel during selected ones of a plurality of sub-scan periods during a complete scan. In such an embodiment, the elements of the transition matrix may have the form of a series of bits specifying whether or not the predetermined voltage is to be applied during each sub-scan period of the relevant transition.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:

1. A method of driving a bistable electro-optic display including a controller, the bistable electro-optic display having a matrix of pixels arranged in rows and columns and including:

a primary pixel that undergoes a transition from a first optical state to a second optical state, a secondary pixel immediately adjacent the primary pixel, wherein the secondary pixel does not undergo an optical state transition, and a tertiary pixel immediately adjacent the secondary pixel, the secondary pixel being between the primary pixel and the tertiary pixel in a row or in a column, wherein the tertiary pixel does not undergo an optical state transition, the method comprising:

a) providing from the controller to the bistable electro-optic display a first update including a first waveform to the primary pixel, a third waveform to the secondary pixel, and a fifth waveform to the tertiary pixel; and b) providing from the controller to the bistable electro-optic display a second update including a second waveform to the primary pixel, a fourth waveform to the secondary pixel, and no waveform to the tertiary pixel, wherein the first and second optical states are different in color or gray scale, and wherein the third waveform, the fourth waveform, and the fifth waveform are all the same, and wherein the first, second, third, fourth, and fifth waveforms each include both positive and negative voltages.

2. The method of claim 1, wherein the bistable electro-optic display is an electrophoretic display.

3. The method of claim 2, wherein the electrophoretic display includes an electrophoretic medium comprising at least three different types of electrophoretic particles.

4. The method of claim 2, wherein the electrophoretic display comprises an electrophoretic medium disposed in a microcapsule layer.

5. The method of claim 2, wherein the electrophoretic display comprises an electrophoretic medium disposed in microcells.

6. The method of claim 1, wherein the bistable electro-optic display comprises a color filter array.

7. The method of claim 1, wherein the bistable electro-optic display comprises at least 10 primary pixels, at least 10 secondary pixels, and at least 10 tertiary pixels.

8. The method of claim 7, wherein the primary pixels define an edge of an image displayed on the bistable electro-optic display.

9. The method of claim 7, wherein the bistable electro-optic display comprises at least 1000 pixels.

10. The method of claim 1, wherein the bistable electro-optic display is capable of producing at least 16 different colors or gray levels.

11. The method of claim 1, wherein the bistable electro-optic display is capable of producing at least 32 different colors.

* * * * *